United States Patent

Ruan et al.

[11] Patent Number: 6,150,639
[45] Date of Patent: Nov. 21, 2000

[54] ANTI-FREEZING SYSTEM, ANTI-FROSTER FOR WINDSHIELD AND REAR WINDOW OF MOTOR VEHICLES

[76] Inventors: Ying Chao Ruan; Jing Qing Tang, both of 7415 Ash Ave., Raytown, Mo. 64133

[21] Appl. No.: 09/281,655

[22] Filed: Mar. 30, 1999

[51] Int. Cl.[7] ............................................... H05B 1/02
[52] U.S. Cl. .................. 219/502; 219/507; 219/518; 219/494; 340/583; 340/580
[58] Field of Search ................... 219/202, 203, 219/494, 497, 501, 505, 518, 519, 522, 507; 340/601, 581, 583, 580

[56] References Cited

U.S. PATENT DOCUMENTS

| | | |
|---|---|---|
| 3,989,633 | 11/1976 | Frisque . |
| 4,065,848 | 1/1978 | Dery . |
| 4,549,471 | 10/1985 | Kochy et al. . |
| 4,712,269 | 12/1987 | Worthen . |
| 4,902,874 | 2/1990 | Tachimuri et al. . |
| 5,010,289 | 4/1991 | Takada . |
| 5,787,228 | 7/1998 | Fiely et al. . |

FOREIGN PATENT DOCUMENTS 58-174046  10/1983  Japan .

*Primary Examiner*—Mark Paschall

[57] ABSTRACT

An automatic, dynamic window anti freezing system for the windshield and the rear window of a motor vehicles parked in cold weather, connected to a battery, comprises a temperature range control-switch unit, an optic frost-monitor, and a sweeping time (frequency)- control to drive a wiper system to work for preventing frost accumulating on the window glass. The temperature unit sets up a certain working range to turn on the system, covering the real freezing stage of the windows. The sweeping time control sets up predetermined sweeping timely manner for the wipers to sweep. The monitor emits light signals to monitor the frost accumulating on the window glass, and actuates the sweeping control to drive wipers to sweep it off when detecting it. The energy consumption is generally exceptional low due to that working is effectively controlled and easily done. Thus a related window is substantially able to avoid freezing on.

The present invention has a subsystem consisted of the monitor and the sweeping control for automatically wiping fog and rain during driving. It is realized by using an appropriate switch to separate it from the temperature unit.

5 Claims, 3 Drawing Sheets

ANTI-FREEZING SYSTEM, ANTI-FROSTER FOR WINDSHIELD AND REAR WINDOW OF MOTOR VEHICLES

BACKGROUND

1. Field of the Invention

This invention relates to window anti freezing systems, especially to motor vehicle window anti freezing systems when parked in cold weather.

2. Description of Prior Art

When a motor vehicle is parked in snowy weather, its windows, especially the windshield, are often covered by ice. A driver must remove the ice before starting driving If ice formed is thick, removing it becomes difficult. This icing problem is referred to as "parking freezing" in this paper application.

There are following basic ways to treat the above problems nowadays: 1. Anti freezing, such as using the windshield washer spray to dissolve the ice (U.S. Pat. No. 5,799,359, etc.); 2. Defrosting, including: using vehicle air-defrost systems (U.S. Pat. No. 4,549,471, etc.); rear window defrost systems (U.S. Pat. No. 4,065,848, etc.); and portable defrosters (U.S. Pat. No. 5,787,228, etc.). 3. Manual tools, such as ice-scrapers (U.S. Pat. No. 4,712,269, etc.); 4. The combinations of the above ways.

However, the "parking freezing" is still not satisfactory solved. Thin ice can be easily treated by using the washer spray and the window wipers, within a few minutes of defrosting. For removing thick ice, people have to mostly rely on the vehicle air defrost systems. A vehicle air defrost system is driven by the engine to create a hot air flow from the vents positioned in the dashboard area, to defrost the windshield and warm the driver-passenger-chamber. However, these systems generally need 15–20 minutes to basically clear the windshield when thick ice is accumulated on it. They even need the double time to clear the rear window without extra help. The most widely used rear window-defrost system is an electric heating wire-network installed in the window glass. It generally needs 15–20 minutes to melt the thick ice, too and often leaves some ice in the less warm glass regions, where the wire of the network is not positioned. The defrost process is equivalent to 10–20 mile driving, consuming 0.4–0.8 gallons of gasoline each time for an average vehicle. Even on a modest estimation, the annual fuel consumption in northern area would be very large, and a great number of useful hours are wasted.

All the above defrost systems and devices are based on a heating approach, relying the engine running and time consuming.

A different approach system, supported by a battery, was disclosed by J. Patent 58-174046. It uses a temperature sensor-switch and a time-relay to actuate vehicle wipers to wipe frost away from the windshield when the ambient temperature drops below a predetermined value, preventing frost from accumulating, while a vehicle is parked. Later, U.S. Pat. No. 5,010,289 etc. disclosed a complex system, adding a humidity switch to the system to actuates wiper to sweep when both the humidity is about 100% and the windshield reaches32F,and installing a heating element of transparent film in the window glass to evaporate the frost at the same time. However, the former system can neither sense frost, nor sense a temperature range. Actually the freezing occurs on the windshield within a temperature range (FTR), it may wider than 10–15 F, depending on the weather and the vehicle, its timing period may vary from 30' to 60', and it generally takes about one hour or more for a warm windshield to cool down to FTR. So by using the above system, a user may make a mistake to turn it or not to turn it on, and does not know how long should keep it in working if turning it on. The latter system does not reliably recognize FTR either. When the weather becomes deeply cold and windy, the temperature changes greatly cross over the windshield, the system losses its common working point, 32 F, its large heating element may need a lot of energy and may not be able to respond to the fast changes of its surface temperature synchronously.

In this application for a letter patent, the authors are presenting a new window anti freezing system, Anti-Froster, powered by a battery. It uses a temperature-range-control switch, a sweeping-time-control and a low energy optic frost-monitor, to drive and handle the vehicle wiper system to work. The temperature unit turns on the system when the window cools down to its FTR, and turns off the system when the window passes the range, realizing an accurate working time control. The monitor uses optic way to detect frost accumulating on the window glass to realize conveniently and highly reliably monitoring, compared to the previous systems. And since the working is well controlled, the energy consumption of the system is the lowest overall. Thus the present invention is an effective and reliable system for solving the "parking freezing" problem for the windshield and the rear window that has a wiper.

The present system has a subsystem consisted of the optic monitor and the sweeping control, for wiping fog and rain automatically during driving. The present invention is an automatic, multi functional window sweeping system.

OBJECTS AND SUMMERY OF THE INVENTION

It is a general object of this invention to provide a highly effective and reliable window anti freezing system for motor vehicles when parked in cold weather.

It is another object of this invention to provide an automatically controlled window anti freezing system for motor vehicles when parked in cold weather.

It is another related object of this invention to provide a low energy consumption window anti freezing system for motor vehicles when parked in cold weather.

It is further object of this invention to provide a vehicle window anti freezing system for both built-in-vehicle use and portable use.

It is another further object of this invention to provide a combination automatic vehicle window sweeping system for anti freezing when parked in cold weather and for wiping fog and rain during driving.

Other objects of this invention will become apparently in the further course.

In accordance with these objects, the present invention is designed on the freezing law and observations on freezing processes on the vehicle window glass, as follows: Clean water freezes only at the water-freezing-point (WFP), 32 F (0 C); freezing on motor vehicle's window glass occurs only when the temperature of the glass drops into the vicinity of WFP. We call this vicinity the freezing (stage)-temperature range (FTR) of the vehicle window. (A detailed description is beyond this application.)

The present invention comprises a temperature-range-control-switch unit, a sweeping-time (frequency)-control device and an optic frost-monitor, to actuate a wiper system to work for a parked vehicle. The temperature unit turns on the monitor within a predetermined temperature range that covers the FTR. The monitor comprises an emitter for emitting predetermined electromagnetic wave signals towards a region of the related window glass, and a sensor unit for receiving the reflected or refracted signal portion from the probed region. If frosting substances exist on the glass, such as snow, ice-particle and water mixture and frost, they will change the received signals, so as to be sensed by the sensor unit, and then a corresponding high level output is produced by the monitor and sent to the sweeping time controlled to drive the wiper system to wipe it away. Then the monitor turns its output to low level to stop the sweeping control, and so the sweeping control stops the wipers till new substance occurs. The energy consumption of the system is low, because the working is well controlled and easy done, a vehicle battery is enough to support it with no big loss in its power, and may soon be recharged when starting driving.

In addition, both the monitor and the sweeping control may make up a subsystem, which can be used to automatically wipe fog and rain during driving, because the rain and fog accumulating on the window changes the received light signals so as to be monitored. The subsystem is easily realized by using an appropriate switch to separate it from the temperature unit, and connect it to a vehicle electric energy source.

DESCRIPTION OF THE DRAWINGS

The present invention and its various objects and aspects may become more readily apparent from the following detailed description of the preferred embodiments illustrated in the accompanying drawings.

Figure 1:
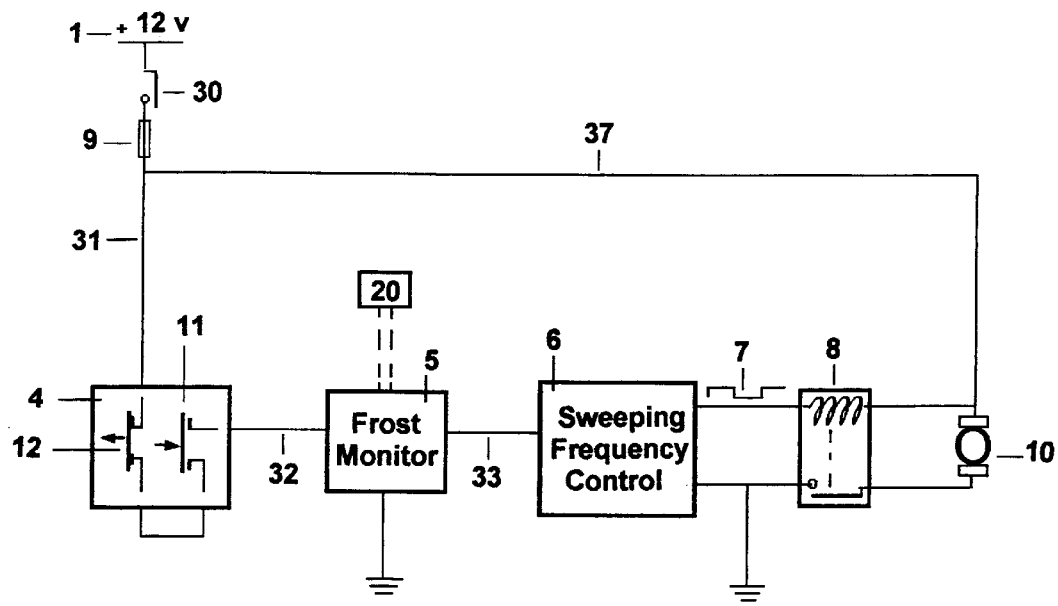
FIG. 1 is a diagram of the present invention with a manual source switch.

The reference letters and numerals in the drawings are as follows:

DETAIL DESCRIPTION OF THE PRESENT INVENTION

FIG. 1 shows a working process of the present invention. A 12 v energy source, 1 is a battery, it is connected to a manual switch 30. Switch 30 is further connected to a temperature range control unit, 4 by line 31. Unit 4 is mounted in vehicle to sense the temperature, T of the outside surface of the related window glass. It has a switching-on functional part 11 and a switching-off part 12, connected to each other in series. Part 11 is constantly open (or infinitive resistance) above a predetermined temperature T1, and automatically becomes closed (or a short-way) when temperature T drops below T1. Part 12 is constantly closed above another predetermined temperature T2, which is lower than T1, and becomes open when T becomes below T2. So unit 4 becomes closed when both part 11 and 12 are closed at the same time to set up a temperature range between T1 and T2 for turning on the system. This range is called the working temperature range. In real situations, the range is set to cover the FTS of the window. Unit 4 is further connected to a frost-monitor, 5 by line 32. Monitor 5 and its variations have been shown in FIGS. 3–4. Unit 5 is further connected to a sweeping-control 6, comprising a pulse generator of predetermined frequency range. Unit 6 has an output relay 8 to handle a wiper motor 10. A completed working process of the above system is as follows: After parking, window temperature T starts dropping down. We suppose that the initial value of T is higher than T1 since the vehicle windows are warm after driving. A user closes switch 30 to turn on the system. Once switch 30 is closed, it connects unit 4 to source 1. Unit 4 is open before temperature drops to T1 as mentioned above. When T drops below T1, unit 4 becomes closed and turns monitor 5 on to source 1. Then monitor 5 starts detecting frosting substances on the related window glass, such as snow, ice-water. If finding such substances, it sends a corresponding high output level to turn on control 6. Control 6 will then send sweeping signals, 7 to relay 8 to drive wiper motor 10 to run to make the wipers sweep till the substance is swept off. Then monitor 5 turns its output to a low level to turn off unit 6, so to stop wipers.

The above process may repeat if monitor 5 finds new substances. The working state of the system will continue till temperature T drops below T2. At this moment, unit 4 becomes open again to turn off the whole system. In the mean time, the window has passed its freezing stage.

T is temperature.
T1 is the higher limit of the working temperature range.
T2 is the lower limit of the working temperature range.

| | |
|---|---|
| 1 is an electric energy source. | 14, 14a, 14b are signal receivers. |
| 2 is a trigger attachment. | 15 are signals emitted by emitter 13. |
| 3 is a relay. | 16 is the reflected signal portion. |
| 3a is a conductive piece of relay 3. | 17 is the refracted signal portion. |
| 4 is a temperature range control switch unit. | 18 is a section of glass. |
| 5 is a frost-monitor unit. | 19 is frost. |
| 6 is a sweeping frequency control. | 20;20a, 20b, 20c are monitoring heads. |
| 7 is output signals of control 6. | 30 is a manual source switch. |
| 8 is an output relay. | 31, 32, 33, 37, 38, 39, 40 are wires. |
| 9 is a fuse. | 52 is a safety timer switch. |
| 10 is a wiper motor. | 53, 54 are processing circuits. |
| 11 is a switching-on part of unit 4. | 60 is a combination switch. |
| 12 is a switching-off part of unit 4. | 61 is a power line. |
| 13 is a light signal emitter. | e, h, s, u are terminals of switch 60. |

The above system uses a manual switch, 30. If temperature T rises higher than T2, the system may automatically starts working again, unless manually opening 30.

Figure 2:
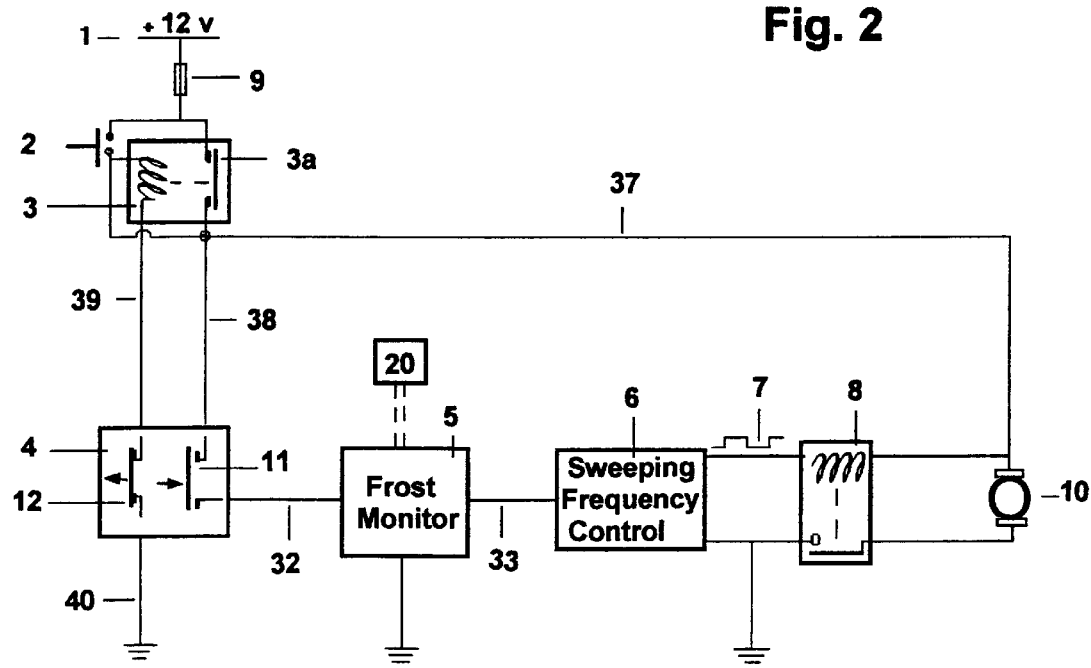
FIG. 2 is a diagram of the present invention with an automatic reset source switch

FIG. 2 shows a system having a different circuit arrangement from the above, working within the same temperature range to wipe frost, but it automatically turns off itself permanently if temperature T drops below T2, unless triggering the system again. The arrangement is as follows: Source 1 is connected to a relay 3, which has a trigger attachment 2 and a spring-conductive piece 3a. Relay 3 has a ground line 39 going through part 12 of unit 4, and a power line 38 related to piece 3 connected to part 11. Part 11 is further connected to monitor 5, etc.. When trigger 2 is pressed, it closes the relay's triggering circuit to turn on relay 3. Once relay 3 is turned on, it remains itself in working by magnetically holding piece 3a even trigger 2 is released. Then the whole system stays in working till part 12 becomes open to turn off relay 3. Then piece 3a is released to turn off the whole system permanently, unless relay 3 is triggered again by pressing attachment 2. In the above circuits, both parts 11 and 12 are set in parallel.

Figure 3:
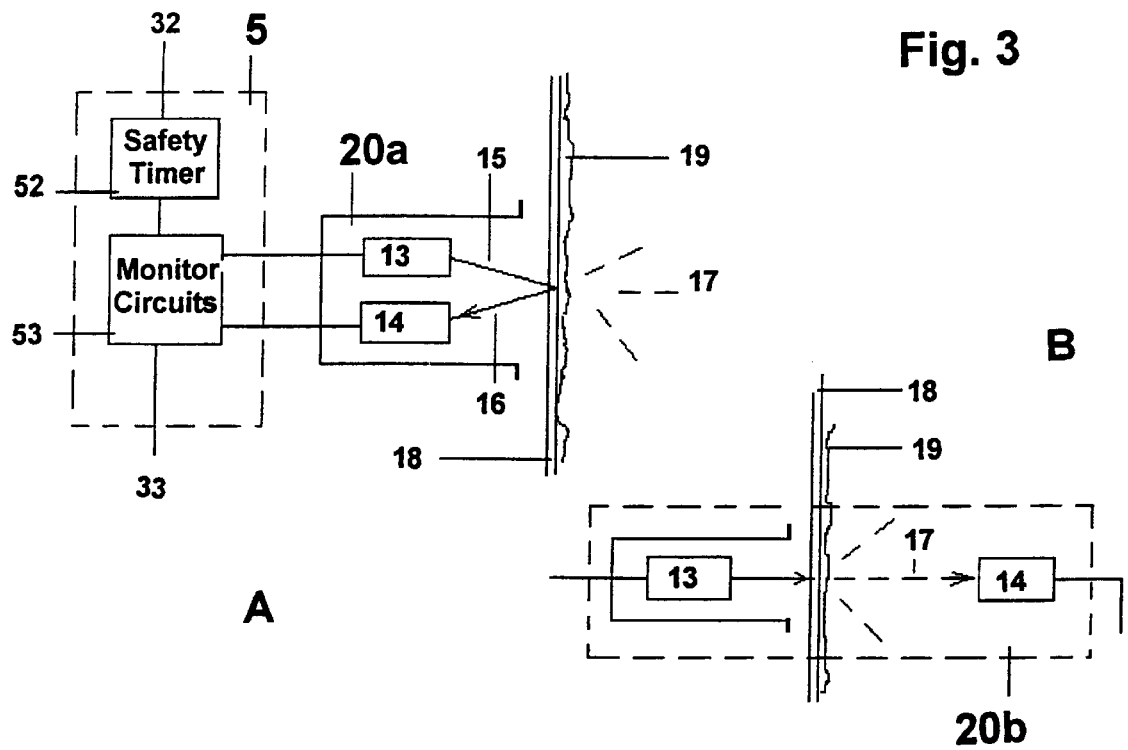
FIG. 3 is a frost-monitor having a single receiver receiving system.

FIG. 3 shows a frost-monitor, having a monitoring head (20a, or 20b), a monitor circuits (53) and a safety timer (52). The head has an emitter (13) and a receiver (14), both the devices are handled by circuits 53 and can be set in the following two ways:

Arrangement A: Both emitter 13 and receiver 14 are held together in head 20a, positioned on the one side of the related window glass 18 to target a certain region of the wipers' sweeping area. When in use, emitter 13 emits predetermined light signals 15 towards the region, and receiver 14 receives the reflected signal portion 16 from the region. If glass is clear, light 15 will penetrate the glass and travel away, receiver 14 actually receives no signal, circuits 53 will not act, corresponding to a low output level. If there is some substance such as snow, or ice-water, or frost accumulating on the window, it will block the signal light and reflect it, receiver 14 will receive the reflected signal portion 16 and produce photo-electric signals to send to circuits 53, causing a high output level through line 33 to turn on sweeping control unit 6 of FIGS. 1–2 to drive the wipers to wipe it away. This process may repeat if new substance occurs. Safety timer 52 sets up a maximum working time to turn off the monitor if unit 4 of FIG. 4 fails to. Head 20a may be mounted on the glass surface or carried by a supporting bar mounted in the window frame area.

Arrangement B: Receiver 14 is placed on the other sides of glass 18 for receiving the refracted signal portion, 17. If glass 18 is clear, receiver 14 will receive maximum signal light intensity. By using a reverse device, the monitor circuits turns its output into a low level, with no influence on the wiper system. If there is frost on the window, it will block signal 17, and make receiver 14 receive weaker signals, causing a high level output to turn on the wipers to remove it.

Figure 4:
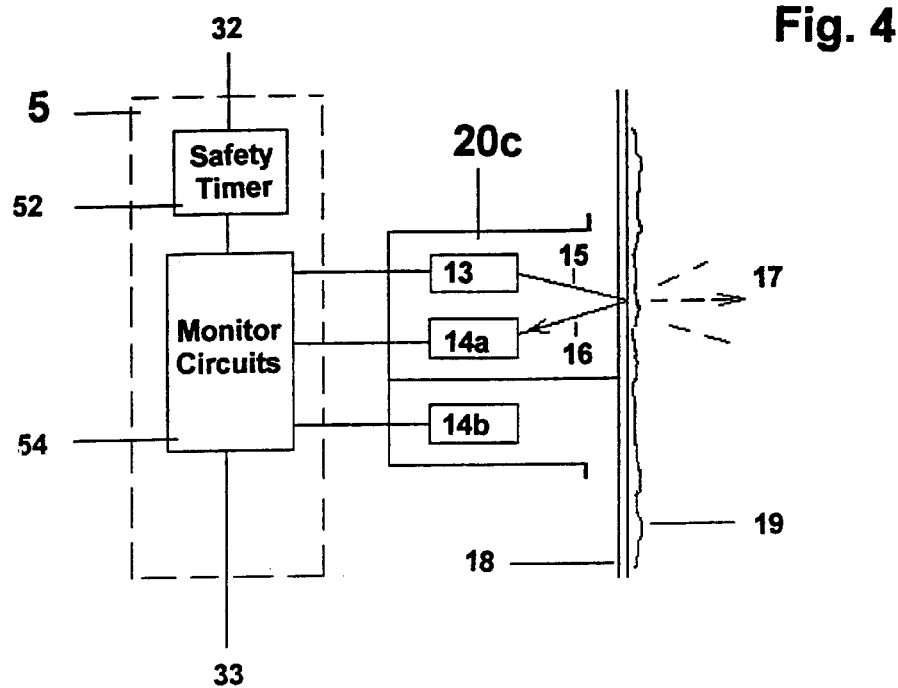
FIG. 4 is an optic frost- monitor having a difference receiving system.

FIG. 4 shows a monitor having a difference signal receiving unit, comprising two receivers, 14a and 14b of the same type. Both the receivers are positioned on the same side of window glass 18, together with emitter 13, held in a monitoring head 20c, but 14b is held separately. When in use, emitter 13 emits signals 15 towards a certain region of glass 18, only receiver 14a is actually able to receive the reflected signals 17 from the region. If glass 18 is clear, signals 15 will penetrate the glass to travel away, so receiver 14a will receives no real signal, both receivers 14a and 14b receive the same background light, which is compensated in monitor circuits 54, the circuits will not act. If snow, ice-water or frost exist, they reflect light signals, so receiver 14a will receive more light than 14b does. Circuits 54 will act due to the difference between the two groups of received light signals by the two receivers respectively and produce a high output level to drive the wipers to remove the substances. The process may repeat if new substances occur.

Figure 5:
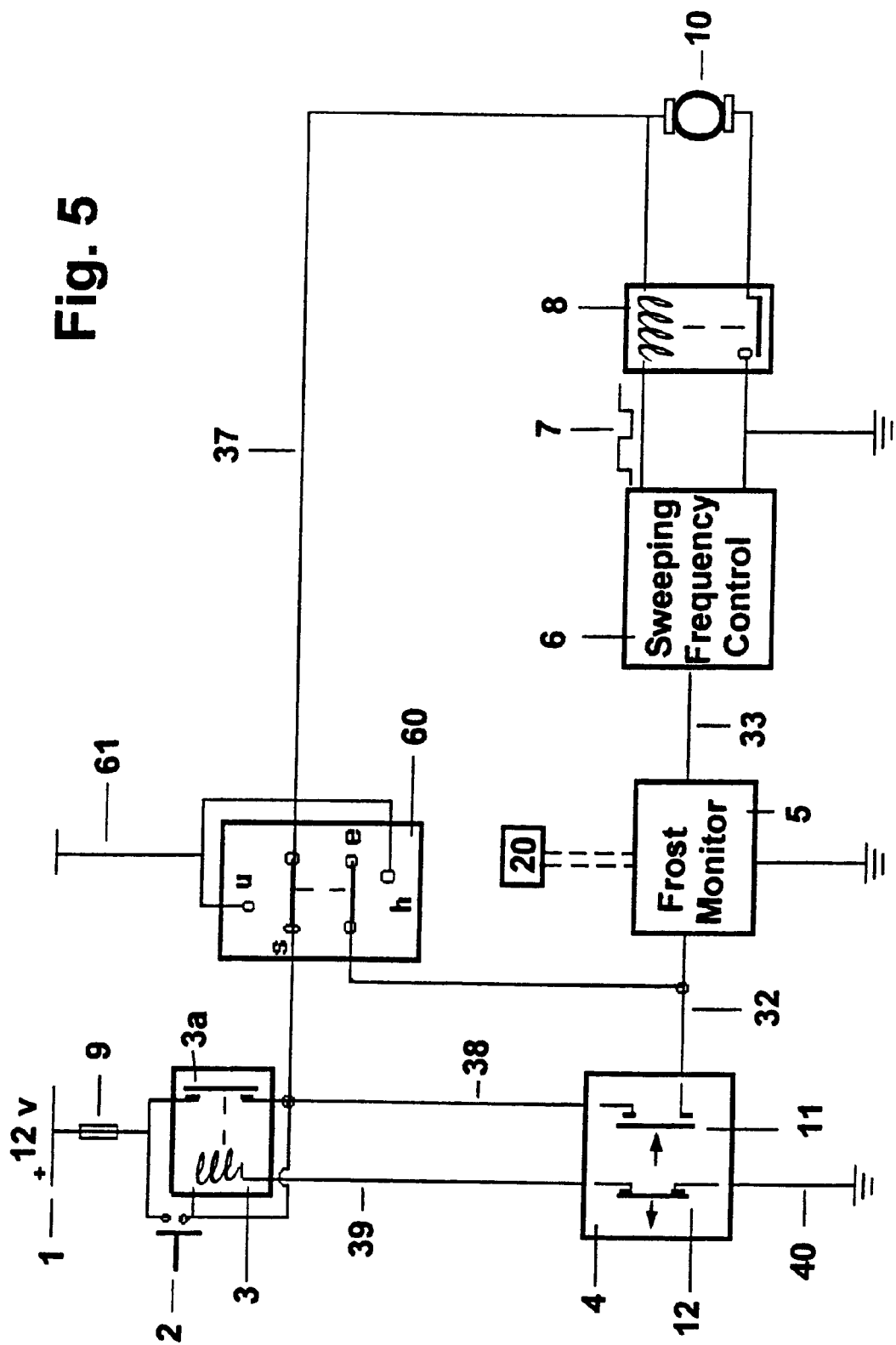
FIG. 5 is a subsystem of the invention for wiping fog and rain during driving.

FIG. 5 shows the new application of a subsystem of the present invention. Monitor 5 and sweeping control 6 make up a smaller system for wiping fog and rain while driving. It is realized by using a combination switch, 60 to separate it from the temperature unit 4 and turn it to a power line, 61 used during driving. Switch 60 has four terminals, e, s, h, and u: Both h and u are connected to line 61, e is related to line 32, and s to line 37. The original anti freezing system corresponds to such a position of switch 60 that it connects monitor 5 to temperature unit 4 and connects motor 10 to power line 31 by closing terminal s and e. When switch 60 turns both monitor 5 and monitor 10 on to power line 61, by closing both terminal h and u, leaving s and u opened, the subsystem is realized.

The scope of the present invention

In summery, the basic characteristics of the present invention are as follows: A window anti freezing system for motor vehicles parked in cold weather, connected to a battery, comprises a temperature range control switch unit, a sweeping frequency control unit and an optic frost-monitor, to drive window wipers to sweep off frost accumulating from the related window glass. The temperature range switch sets up a predetermined working temperature range covering the freezing stage of the window glass to turn on the monitor. The monitor emits light signals towards the window to detect frost accumulating on the window, and produces a corresponding high level output to actuate the sweeping control to drive wipers to sweep it off when finding it, such that the related window is substantially able to avoid freezing on. The present invention has a subsystem consisted of the monitor and the sweeping control for wiping fog and rain automatically during driving.

It is understood that any changes in the temperature range control switch unit, the optic defrost-monitor unit, the sweeping-time(or frequency) control, related circuits, materials and the way of setting and arranging the system, without changing the functions mentioned above, are within the spirit of the present invention and will not depart from its scope.

We claim:

1. An optically monitored and freezing-temperature handled anti freezing system for preventing frost from accumulating on a window of a parked motor vehicle having a battery and a wiper system of a predetermined number of appropriate wiper units, said system having an optically monitored sub-system for wiping fog and rain, comprising:

an optic window monitor for monitoring certain substances accumulating on the glass of said window to produce an output signal when detecting said substances, having a monitoring head and a related monitor circuits, said substances including snow, frost, fag, and rain, a temperature range control switch unit for providing an electrically short way passing through it when the temperatures sensed by said temperature unit fall into a certain range between a predetermined higher temperature limit and a predetermined lower temperature limit, corresponding to the freezing temperature range of said window, within said freezing range freezing may occur on said window glass, a sweeping time control for providing predetermined sweeping timely manner signals, handling means responsive to said sweeping manner signals for operating said wipers, connecting means for sending said output signal from said monitor to actuate said sweeping time control, switch means for either connecting said monitor to said temperature range unit for realizing said anti freezing system, or connecting said monitor to said battery for realizing said sub-window system, comprising a combination electric switch of said both connecting ways, source-switch means for connecting said temperature unit to said battery.

2. The optically monitored and freezing temperature handled anti-freezing system of claim 1 wherein said monitoring head comprises an emitter unit properly positioned in the inside(or outside) vicinity of said window for transmitting predetermined electromagnetic wave signals towards a required region of said window glass to produce reflected signals and refracted signals of penetrating said glass from said region, a sensor unit having a predetermined number of optic sensors properly positioned in said inside (or outside) vicinity respectively for receiving said reflected signals or positioned in the outside (or inside) vicinity of said window for receiving said refracted signals in appropriate way to effectively sense their changes caused by said substances accumulating on said window glass to produce corresponding photo-electric signals, mounting means for properly positioning both said emitter unit and said sensors in said vicinities respectively so as to make said emitter target said region properly and make said sensor unit effectively receive said signals from said region.

3. The optically monitored and freezing temperature handled anti-freezing system of claim 1 wherein said monitor circuits includes signal handling for making said emitter unit transmit said predetermined signals, signal processing for processing said corresponding photo-electric signals from said sensor unit to produce said output signal of said monitor, a timer for setting maximum working time to turn off said circuits.

4. The optically monitored and freezing temperature handled anti-freezing system of claim 1 wherein said temperature range control switch unit includes a switching-on part being electrically open when its sensed temperature is higher than said higher temperature limit, and turning to be electrically closed when its sensed temperature drops below said higher limit, and a switching-off part being electrically closed when its sensed temperature is higher than said lower temperature limit, and turning to be open when its sensed temperature drops below said lower limit, wherein said two parts may be related to each other in series or not.

5. The optically monitored and freezing temperature handled anti-freezing system of claim 1 includes an electric switch, or a relay switch having a power switch part and a triggering part for handling said said power switch part, with said triggering part connected to said switching-off part and with said power switch part connected to said switching-on part respectively.

* * * * *